United States Patent [19]

Mizumoto

[11] Patent Number: 4,460,856
[45] Date of Patent: Jul. 17, 1984

[54] TWO-PHASE BRUSHLESS MOTOR DRIVING CIRCUIT

[75] Inventor: Katsuji Mizumoto, Saitama, Japan

[73] Assignee: Pioneer Electronic Corporation, Tokyo, Japan

[21] Appl. No.: 473,423

[22] Filed: Mar. 9, 1983

[30] Foreign Application Priority Data

Mar. 9, 1982 [JP] Japan .............................. 57-32869[U]

[51] Int. Cl.³ ............................................ H02K 29/02
[52] U.S. Cl. ................................... 318/254; 318/138; 318/439
[58] Field of Search .................. 318/138, 254, 254 A, 318/439, 416

[56] References Cited

U.S. PATENT DOCUMENTS 3,375,422 12/1964 Boudigues .......................... 318/138
4,246,518 1/1981 Kögler et al. ....................... 318/138
4,396,875 8/1983 Yamauchi ........................... 318/138

Primary Examiner—G. Z. Rubinson
Assistant Examiner—Bentsu Ro
Attorney, Agent, or Firm—Sughrue, Mion, Zinn, Macpeak & Seas

[57] ABSTRACT

A driving circuit for a two-phase brushless motor includes a servo control device operating to make constant the phase difference between a sum signal indicative of the current sum flowing through the motor coils and a positional signal indicative of the relative position of the motor rotor and the coils.

9 Claims, 4 Drawing Figures

TWO-PHASE BRUSHLESS MOTOR DRIVING CIRCUIT

BACKGROUND OF THE INVENTION

The present invention relates to a two-phase brushless motor driving circuit.

Referring to FIG. 1, a system for driving a two-phase brushless D.C. motor is shown. In FIG. 1, numeral 1 denotes a rotor magnet magnetized by a sine-wave current. Hall elements 4 and 5 are arranged opposite to the surface of the rotor 1 and apart from each other by an electric angle $\pi/2$, radians in order to detect respective relative positions between the rotor 1 and the first phase drive coil 2 and second phase drive coil 3. The detected outputs from the Hall elements 4 and 5 are amplified by respective driving amplifiers 6 and 7 to supply currents to each phase of coils 2 and 3. Thus a first phase drive loop is composed of the Hall element 4, the driving amplifier 6, and the first phase coil 2, and on the other hand, a second phase drive loop is composed of the Hall element 5, driving amplifier 7, and the second phase coil 3. By the current flowing into the coils 2 and 3 and the magnetic flux due to the rotor magnet 1, the torque of the motor is produced.

Numeral 8 designates a control device for controlling the current flowing into the coils 2 and 3, namely the motor torque, and numeral 9 designates an adjustor for adjusting any deviation of the loop gains of the respective drive loops produced by a difference in amplifying gain of the driving amplifiers 6 and 7 and further any difference in the detection sensitivity of the Hall elements 4 and 5, i.e. a difference in conversion gain, to thereby make the current flowing into each phase coil substantially equal, by an adjustment of the amplifying gain of the amplifier 7.

In a simplified case where a voltage of $+1$ volt is applied across the ends of the each coil when the magnetic pole of the rotor 1 is N, a voltage of 0 volts is applied when the magnetic pole is located between N and S, and a voltage of $-1$ volt is applied when the magnetic pole is S, the current flows into the coils and the rotor 1 is energized according to Fleming's left-hand rule, and the rotational impetus of the motor is maintained by changing over the current.

Referring to relationships representing the above, in the case where the magnetic field of the rotor magnet 1 is taken as $B \sin \omega t$; the outputs of the respective Hall elements 4 and 5, $S_1 = BH_1 \sin \omega t$ and $S_2 = BH_2 \sin (\omega t + \pi/2) = BH_2 \cos \omega t$ respectively, the currents $I_1$ and $I_2$ for the phase coils 2 and 3 are represented by the following equations.

$$I_1 = CA_1 BH_1 \sin \omega t \quad (1)$$

$$I_2 = CA_2 BH_2 \cos \omega t \quad (2)$$

Where B is the maximum value of the magnetic flux density, $H_1$ and $H_2$ are conversion gains of the Hall elements 4 and 5 respectively, C represents a control amount of the amplifiers 6 and 7 due to the control device 8, and $A_1$ and $A_2$ are the amplifying gains of the amplifiers 6 and 7, respectively.

When each of the coefficients in the above equations (1) and (2) are made the same by means of adjustment of the adjustor 9, and further where $CA_1 BH_1 = CA_2 BH_2 = I_0$ is set, the following equations are obtainable.

$$I_1 = I_0 \sin \omega t \quad (3)$$

$$I_2 = I_0 \cos \omega t \quad (4)$$

Therefore, the motor torque T where $\alpha$ = an effective length of the coil, is as follows:

$$T = (B\sin\omega t) \cdot (I_0 \sin\omega t) \cdot \alpha + (B\cos\omega t) \cdot \alpha \cdot (I_0 \cos\omega t) \quad (5)$$

$$= \alpha \cdot BI_0 (\sin^2 \omega t + \cos^2 \omega t)$$

$$= BI_0 \cdot \alpha$$

Thus a constant motor torque is obtained.

In such an arrangement as above, it is inevitably necessary to adjust the amplifying gain with an adjustor in order to obtain a constant motor torque, and further, it is in actuality difficult to maintain a constant motor torque owing to variations in temperature and time lapse etc., thereby producing a ripple in the motor torque.

SUMMARY OF THE INVENTION

An object of the present invention is to provide a two-phase brushless motor driving circuit which can provide a constant motor torque by an automatic adjustment, without need of manual adjustment.

One characteristic feature of the two-phase brushless motor driving circuit of the present invention resides in a construction such that one of the loop gains of first and second drive loops is controlled in a manner such that a difference in phase between a sum signal representing a sum current flowing into both first and second phase coils, and signals representing relative positions from a Hall element, assumes a predetermined value.

In particular, the Hall elements are disposed apart from each other by an electrical angle of $\pi/2$, and the above difference in phase is automatically controlled so as to usually become $\pi/4$ radians.

BRIEF DESCRIPTION OF THE DRAWINGS

Preferred embodiments of the present invention will be explained hereinafter with reference to the following drawings, in which.

DETAILED DESCRIPTION OF THE PREFERRED EMBODIMENTS

Figure 1:
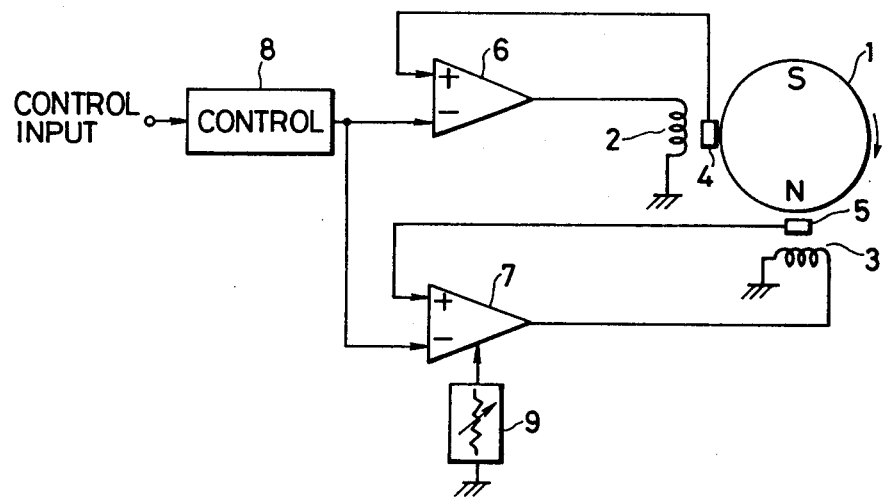
FIG. 1 shows a conventional two-phase brushless motor driving circuit.
Figure 2:
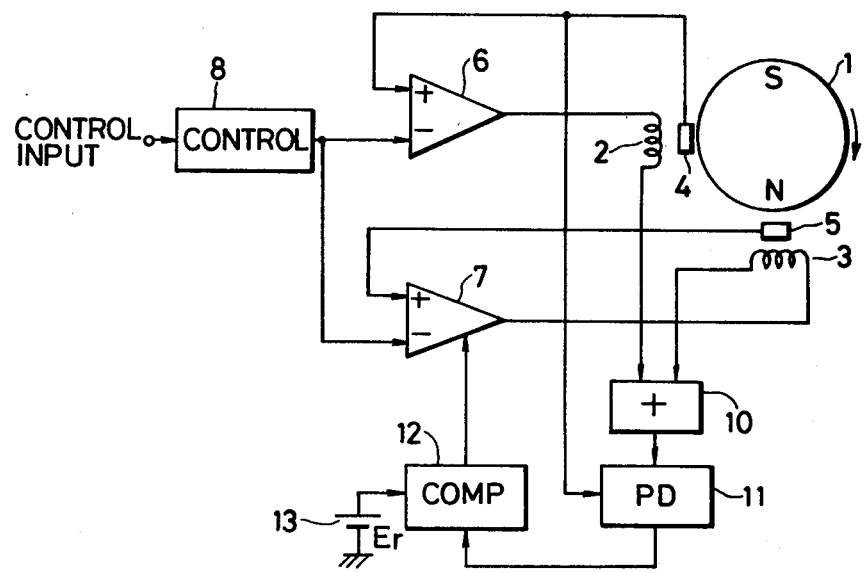
FIG. 2 shows a first embodiment of the present invention.

Referring now to FIG. 2, a circuit configuration according to one embodiment of the invention is shown. In FIG. 2, parts equivalent to those shown in FIG. 1 are designated by the same reference numerals and a detailed explanation thereof is omitted. In FIG. 2, numeral 10 designates a current adder for outputting a signal corresponding to the sum value of the currents flowing into the first and second phase coils. This output signal is applied to one input of a phase comparator 11, while the detected output signal from the Hall element 4 of the first phase is applied as the other input thereto. The phase comparator 11 may be composed of a two-input AND gate and a low-pass filter. The output of the low-pass filter is a D.C. signal with a level corresponding to the difference in phase of the two signals mentioned above, and this D.C. signal is compared with a reference level $E_r$ produced by a reference level generator 13, in a comparator 12. By the output of the comparator 12, the gain of the driving amplifier 7 of the second phase is adjusted to thereby form a servo system.

If the servo system according to the present invention is not used, the current of each phase is represented as shown in equations (1) and (2). Therefore, the output of the adder 10 is as follows:

$$I_{L1} + I_{L2} = CB(A_1H_1 \sin\omega t + A_2H_2 \cos\omega t) \quad (6)$$

$$= CB\sqrt{(A_1B_1)^2 + (A_2H_2)^2} \cdot \sin\{\omega t + \phi\}$$

$$\phi = \tan^{-1}(A_2H_2/A_1H_1) \quad (7)$$

As is apparent from the above equations, the ratio $(A_2H_2/A_1H_1)$ of the peak current values of both currents $I_{L1}$ and $I_{L2}$ represents the phase of the sum output, and therefore the difference in phase between the sum output signal and the detected output signal obtained from the first-phase Hall element 4 becomes $A_2H_2=A_1H_1$ when $\phi=\tan^{-1}(A_2H_2/A_1H_1)=45°$. Therefore a constant motor torque as shown in equations (3), (4) and (5) is obtained by adjusting the amplifying gain of the amplifier 7 in a manner such that the difference in phase is usually kept to 45°, by obtaining the signal corresponding to the phase difference between the output of the Hall element 4 and the output of the adder 10, produced by the comparator 11. To this end, the reference level $E_r$ of the level comparator 12 is set to a level corresponding to the phase difference 45°, to thereby make the servo system operate such that an output of zero level is usually produced.

In the embodiment of the present invention, the amplifying gain of the amplifier 7 is controlled, but it may be possible to adjust the detection sensitivity, i.e. the conversion gain, of the second-phase Hall element 5 with the same result. Further, it may be possible to invert the output signal of the phase difference and to control the amplifying gain of the amplifier 6 in the first-phase drive loop, or the detection sensitivity of the Hall element 4. Further a similar result may be obtained by comparing the current sum signal with the detected signal of the second-phase Hall element 5 in order to control each loop gain.

Figure 3:
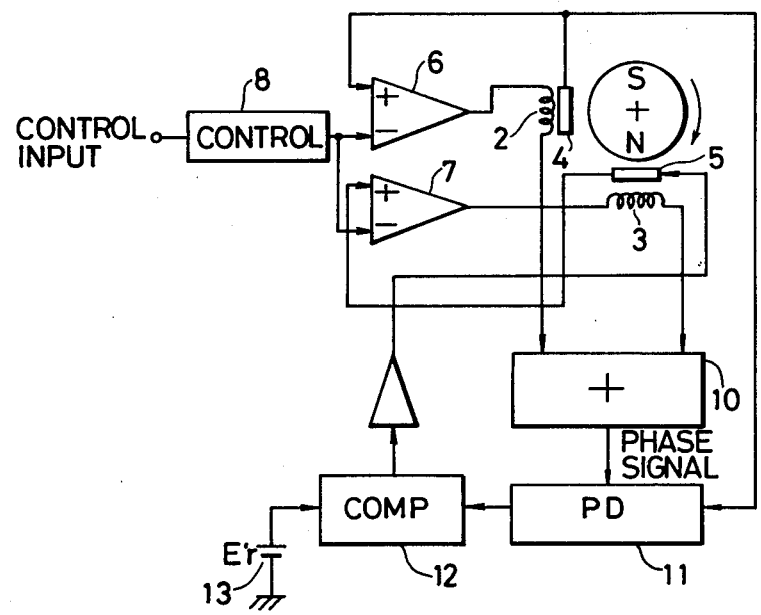
FIGS. 3 and 4 show additional embodiments of the present invention.
Figure 4:
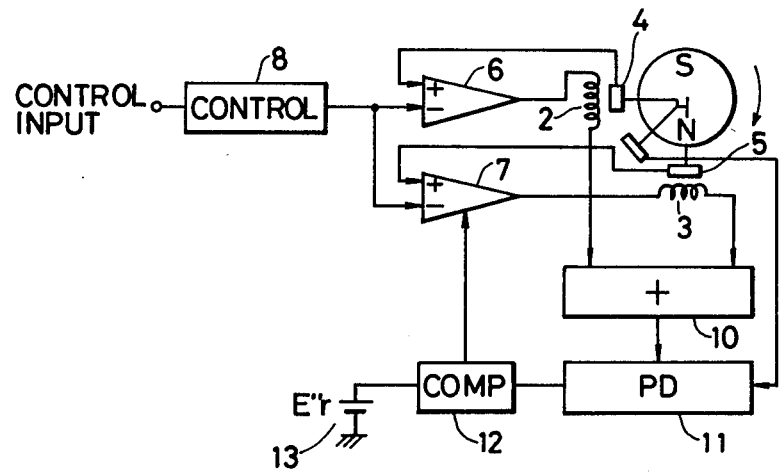

With a circuit arrangement shown in FIG. 3, it is possible to control the servo system so that the phase difference is 45°. Still further, it may be possible to provide an additional position detecting element at an intermediate position between the two position detecting elements, as shown in FIG. 4, namely at the position of the electrical angle 45°, and to control the servo system so as to zero the phase difference from the sum signal by means of the phase detection circuit.

In the embodiments described above, the adjustment of the amplifying gain of the amplifier and the detection sensitivity of the Hall element are determined depending upon the direction of rotation of the motor.

As stated above, according to the present invention, variations produced in each loop gain of each drive loop can be automatically adjusted, and therefore a constant motor torque can be obtained despite such variations.

What is claimed is:

1. A two-phase brushless motor driving circuit comprising; first and second drive loops for driving a first phase coil and a second phase coil with first and second currents, respectively, in accordance with signals generated by sensing elements representing the respective relative positions between a rotor of said motor and said first and said second phase coils, means for generating a sum signal representing a sum of the said first and second currents flowing into both of said first and second phase coils, and means for controlling a loop gain of one of said first and second drive loops such that a difference in phase between said sum signal and one of said signals representing said relative positions, assumes a predetermined value.

2. A two-phase brushless motor driving circuit according to claim 1, wherein the detection of said relative positions is achieved by including first and second position detecting elements for detecting said relative positions, said detecting elements being oppositely positioned with respect to said rotor and apart from each other by an angle of $\pi/2$ radians, said predetermined value constituting a phase difference being $\pi/4$ radians.

3. A two-phase brushless motor driving circuit according to claim 1, each of said drive loops including amplifier means, said controlling means outputting a signal to one of said amplifier means to control said loop gain of the respective drive loop.

4. A two-phase brushless motor driving circuit according to claim 1, including position detectors for detecting said relative positions, an output of one of said detectors being fed to phase detection means as one input thereto, and summing means for forming said sum signal, said sum signal being applied as a second input to said phase detection means.

5. A two-phase brushless motor driving circuit according to claim 4, including comparator means for comparing an output of said phase detection means with a reference value corresponding to said predetermined phase difference value.

6. A two-phase brushless motor driving circuit according to claim 1, including position detectors for detecting said relative positions, said controlling means controlling said loop gain by adjusting the sensitivity of at least one of said position detectors.

7. A two-phase brushless motor driving circuit according to claim 6, said position detectors comprising Hall effect elements.

8. A two-phase brushless motor driving circuit according to claim 2, said position detectors comprising Hall effect elements, and further including a third position detecting element equally positioned between said first and second position detecting elements and spaced at an angle of $\pi/4$ radians.

9. A two-phase brushless motor driving circuit according to claim 8, including summing means for forming said sum signal, and phase comparator for means receiving said sum signal and an output of said third position detection element.

* * * * *